No. 629,728. Patented July 25, 1899.
W. H. TRAPHAGEN.
STALK CUTTER.
(Application filed Nov. 21, 1896.)
(No Model.) 2 Sheets—Sheet 1.

Witnesses
E. M. Jackson
E. Behel

Inventor
William H. Traphagen
By A. O. Behel
Attorney

No. 629,728. Patented July 25, 1899.
W. H. TRAPHAGEN.
STALK CUTTER.
(Application filed Nov. 21, 1896.)
(No Model.) 2 Sheets—Sheet 2.

Witnesses
E. M. Jackson
E. Behel

Inventor
William H. Traphagen
By A. O. Behel
Attorney

UNITED STATES PATENT OFFICE.

WILLIAM H. TRAPHAGEN, OF ROCKFORD, ILLINOIS, ASSIGNOR TO THE EMERSON MANUFACTURING COMPANY, OF SAME PLACE.

STALK-CUTTER.

SPECIFICATION forming part of Letters Patent No. 629,728, dated July 25, 1899.

Application filed November 21, 1896. Serial No. 612,994. (No model.)

*To all whom it may concern:*

Be it known that I, WILLIAM H. TRAPHAGEN, a citizen of the United States, residing at Rockford, in the county of Winnebago and State of Illinois, have invented certain new and useful Improvements in Stalk-Cutters, of which the following is a specification.

The object of this invention is to adjust the striking force of the cutters and of hooks for straightening the stalks held in working position by spring action.

Figure 1:
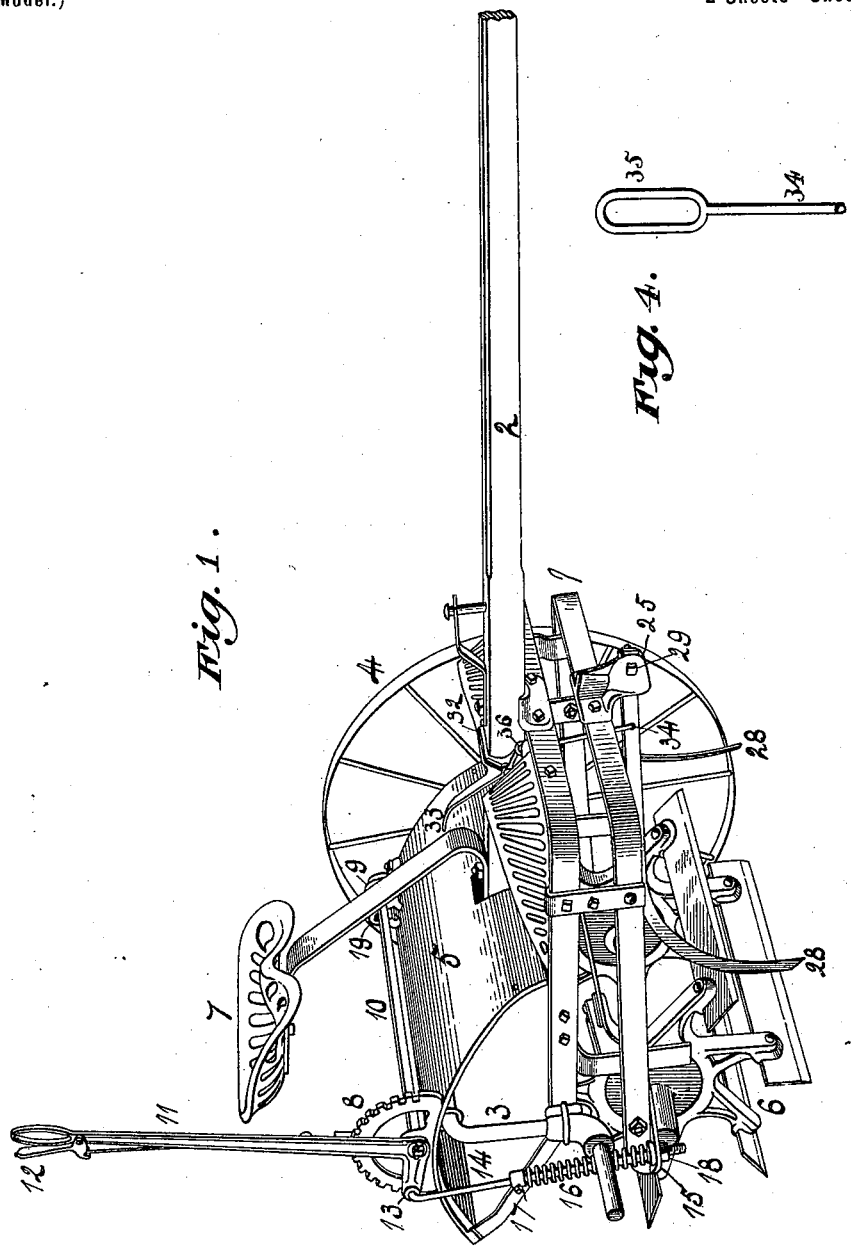
Figure 2:
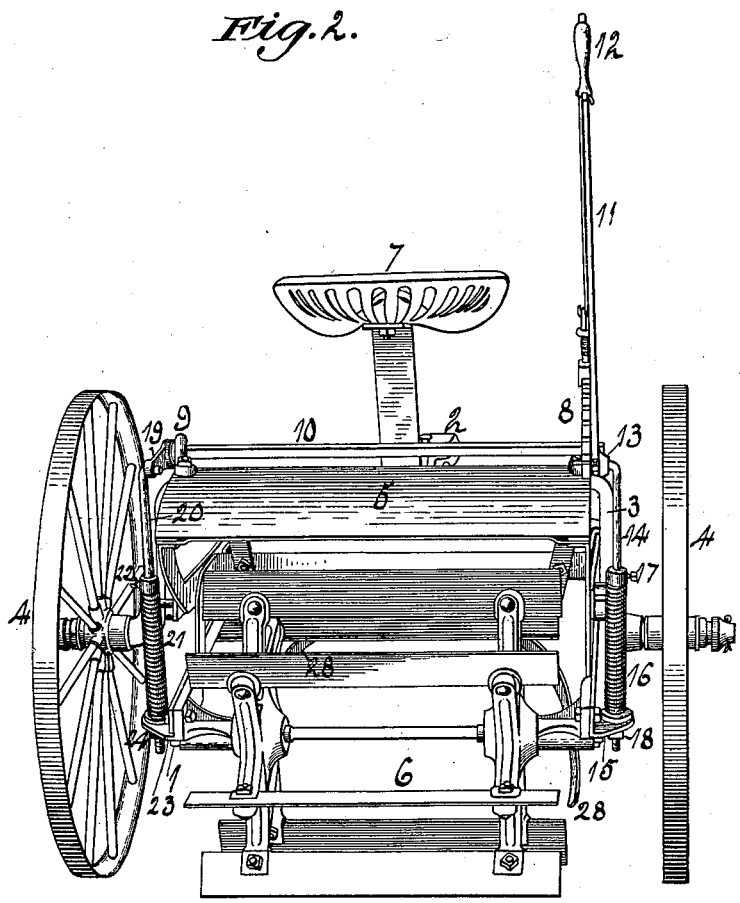
Figure 3:
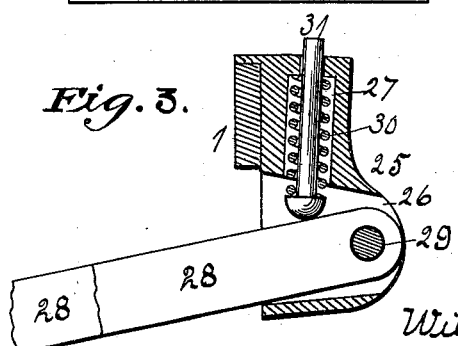

Figure 1 is a perspective view of a stalk-cutter embodying my invention. Fig. 2 is a rear elevation. Fig. 3 is a lengthwise vertical section through the hooks, showing the spring for holding them in working position. Fig. 4 is a view of the upper end of one of the links 34.

The stalk-cutter shown in the accompanying drawings in the main is of an old construction to which my improvements have been applied. This old construction consists of the main frame 1, tongue 2, axle 3, wheels 4, shield 5, cutting-reel 6, and driver's seat 7, connected together in any suitable manner.

To the upper surface of the shield 5 are secured a toothed segment 8 and a perforated bracket 9. A shaft 10 is supported by this segment and bracket in a manner to oscillate, to one end of which is secured a hand-lever 11, provided with a thumb-lever 12, having a dog to engage the teeth of the segment. This lever has an extension 13, to which a rod 14 is connected, its free end passing through a bracket 15, connected to the main frame. A spring 16 surrounds this rod, one end resting against the bracket 15 and a collar 17, set-screwed to the rod, forming a stop to its outer end, the lower end of the rod, being screw-threaded, receiving a nut 18 below the bracket. The other end of the shaft 10 has a similar connection with the main frame through the medium of the arm 19, rod 20, spring 21, collar 22, bracket 23, and nut 24. This arrangement forms a spring connection between the lifting-lever and main frame, and when it is desired to adjust the tension of the springs while the cutters are in working position the nuts 18 and 24 are turned to the end of their rod-supports, and then the hand-lever is moved forward, which will give slack to the spring when the collars on the rods are moved along the rods, and when properly located are set-screwed in position. The hand-lever is then moved rearward, placing the tension on the springs and taking it off the nuts in order that the nuts may be turned upon the rods to raise the cutters the proper distance above the ground for transportation.

To the front face of the main frame is secured a bracket 25, having a horizontal opening 26 and a vertical cylinder-opening 27, connected to its upper end. Two hooks 28, employed to straighten the stalks, have their ends located within the horizontal opening, and a bolt 29, passing through the hooks and bracket, forms a pivotal connection between the parts. Within the vertical opening 27 of the bracket is located a spiral spring 30, surrounding a plunger 31, one end of the spring resting against the head of the plunger and its other end against the contracted end of the opening. The head of the plunger rests upon the hooks 28. Should either hook strike an obstacle, the spring 30 will yield, allowing the hook to rise and pass over the obstruction, when the spring will force it down into working position. Either or both hooks will be acted upon by the spring.

To the tongue of the stalk-cutter is pivoted a foot-lever 32, having a projection 33 extending rearward within easy reach of the driver. To this lever are pivotally connected links 34, their other ends connected to the hooks. By depressing this lever the hooks may be raised and freed of weeds or obstructions. The upper ends of these links 34 are formed with a loop 35, which receives the extension 36, projecting from the lever. By this connection the hooks are free to rise independently of each other.

I claim as my invention—

1. In a stalk-cutter, the combination of a cutting-reel, a main frame, a bracket secured thereto, two independent hooks pivotally connected to the bracket, and a spring acting upon the hooks holding them in working position allowing either or both to rise.

2. In a stalk-cutter, the combination of a main frame, a cutting-reel, hooks pivotally connected to the frame at one end, a foot-lever, links having their upper ends slotted and connected with the foot-lever their lower ends connected to the hooks, whereby the hooks have a vertical movement independent of each other and their connection with the lever.

WILLIAM H. TRAPHAGEN.

Witnesses:
H. R. TRAPHAGEN,
A. O. BEHEL.